Dec. 22, 1964     E. L. TURNER     3,162,736
FLUID FLOW RESPONSIVE TIMING MECHANISM
Original Filed Feb. 24, 1960
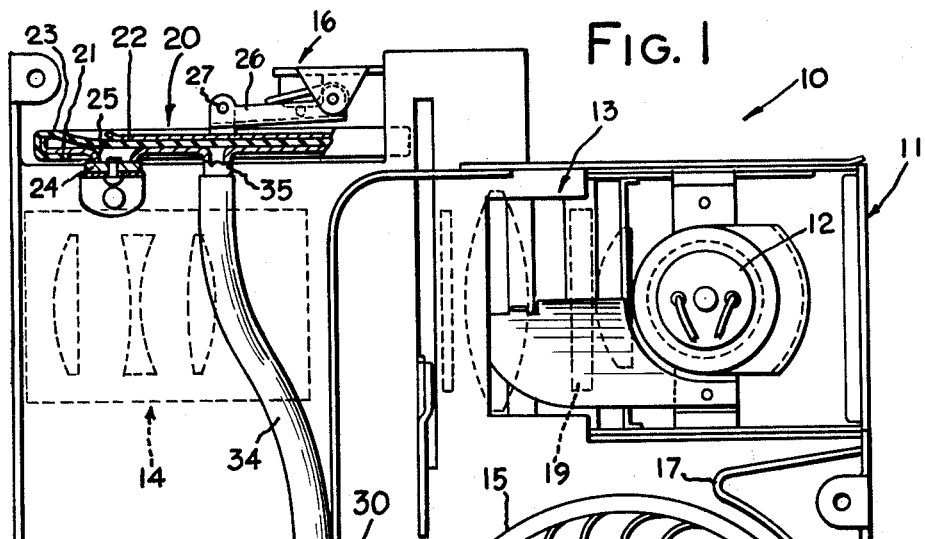
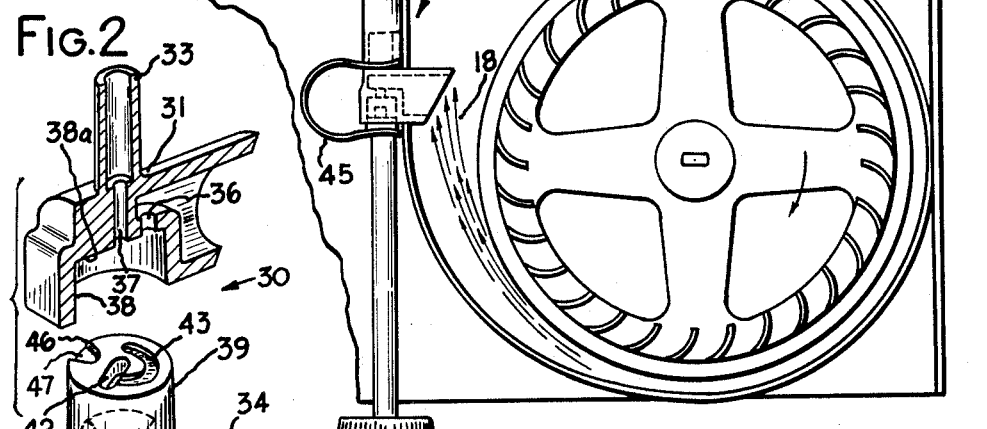
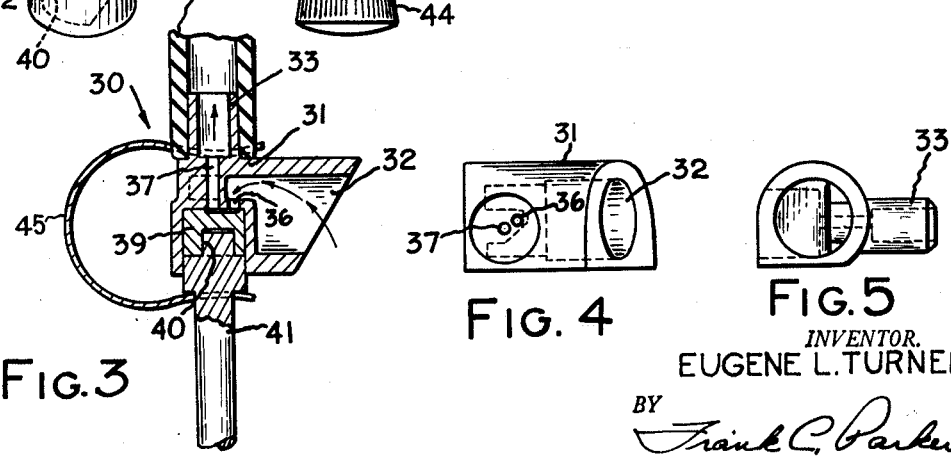
INVENTOR.
EUGENE L. TURNER
BY Frank C. Parker
ATTORNEY

United States Patent Office 3,162,736
Patented Dec. 22, 1964

3,162,736
FLUID FLOW RESPONSIVE TIMING MECHANISM
Eugene L. Turner, Brighton, N.Y., assignor to Bausch & Lomb Incorporated, Rochester, N.Y., a corporation of New York
Continuation of application Ser. No. 10,734, Feb. 24, 1960. This application Oct. 3, 1962, Ser. No. 228,788
1 Claim. (Cl. 200—81.9)

The present invention relates to timing devices and finds particular utility as a timing device suitable for use in a transparent slide projector.

This is a continuation of my copending application, Serial No. 10,734, filed February 24, 1960, and now abandoned.

In the past, a number of complicated timing mechanisms have been proposed for timing the interval during which the image from a transparent slide is projected onto a viewing screen but it has been found that the timing mechanims disclosed herein which utilizes an air responsive bellows for actuating a time control switch is particularly suitable for this purpose.

Therefore, a principal object of the present invention is to provide an improved timer mechanism actuated in response to a flow of air and including a variably positionable tortuous path in order for controlling the time interval during which sufficient air pressure is being built up to actuate a bellows controlled switch.

An advantage of the present timing mechanism resides in its simplicity and the ease with which the same is adapted for manual control.

The foregoing objects and advantages of the present invention will become more apparent from the following detailed description when read in conjunction with the accompanying drawing, wherein:

FIG. 1 represents a partially schematic plan view of the underside of a transparent slide projector utilizing a timer mechanism constructed in accordance with the principles of the present invention;

FIG. 2 is an exploded perspective view shown partly in section and illustrating in detail the time control mechanism;

FIG. 3 is an elevational sectional view of the time control mechanism;

FIG. 4 is a view of the underside of the time control mechanism, as viewed in FIG. 3; and FIG. 5 is a side view of the time control mechanism.

With reference now to the drawing, wherein like reference numerals have been used in the different views to identify identical parts, and with particular reference to FIG. 1, there is shown in said figure a transparent slide projector designated generally by reference numeral 10. The slide projector 10 comprises a base 11 on which is mounted a projection lamp 12 and which supports a condenser lens assembly 13, a projection lens assembly 14, a blower fan 15 driven by a motor (not shown) but also mounted on the base 10, and a microswitch 16 controlled by the timer mechanism comprising the subject matter of the present invention. Also mounted on the base 10 is a deflector shield 17 which extends around the blower wheel 15 in order to direct a flow of air indicated by arrows 18 toward the projection lamp 12 and toward a heat-absorbing glass 19 in order to dissipate excessive heat generated by the projection lamp 12.

The timer mechanism comprises a bellows 20 consisting of a fixed side 21 securely mounted on the base 10, a movable side 22 and a flexible membrane 23 interconnecting the fixed side 21 and movable side 22. A valve mechanism 24 comprising a flapper which is spring urged into seating engagement over an opening 25 in fixed side 21 is provided for closing the bellows or for opening the bellows at the proper time in order to enable the movable side 22 to return to the position shown and thus enable an arm 26 pivotally connected to movable bellows member 22, as indicated at 27, to actuate the microswitch 16.

A timing valve mechanism, indicated generally by reference numeral 30, includes a housing portion 31 consisting of an inlet 32 disposed in the flow path of the air as represented by arrows 18, and an outlet 33 connected to bellows 20 by means of a flexible tube 34 which is in communication with outlet 33 and with an inlet 35 formed as an integral part of fixed side 21. The casing member 31 is formed with a pair of openings 36 and 37 which respectively communicate with the inlet 32 and outlet 33.

The casing 31 is shaped as indicated at 38 for receiving a valve spool 39. The valve spool 39 is also provided with a flat-sided bore 40 within which a control handle 41 may be received. The spool 39 includes a relatively large groove 42 which is capable of bridging both openings 36 and 37 in order to provide a path for relatively free flow of air between openings 36 and 37. The spool 39 is also formed with a curved tortuous path 43, one end of which is in communication with groove 42 and the remainder of which is adapted to communicate with opening 36. The rod 41 is formed with a manual control button 44 in order for controlling the rotative position of spool 39 and a U-shaped leaf spring 45 is provided for retaining the rod 41 and the valve mechanism 36 in assembly and, at the same time, holds the valve spool 39 tightly seated against surface 38a.

By positioning the spool 39 in a position where the groove 42 bridges the two openings 36 and 37, air pressure will rapidly build up within outlet 33 and bellows 20 to a value sufficiently great to cause the movable bellows plate 22 to move upwardly, as viewed in FIG. 1, in order to actuate microswitch 16. At the proper time in the cycle of operations, valve 24 will open in order to empty the bellows 20 and permit the movable member 22 to return to the position shown in FIG. 1.

When the knob 44 is rotated so as to rotate the valve spool 39 to a position to bring the tortuous path or groove 43 into communication with opening 36, it will be apparent that the length of path through which the air must flow in going from the inlet 32 to the outlet 33 is increased and this has the effect of varying the time required for the pressure to build up in the bellows 20 sufficiently to actuate the microswitch 16. This time interval is proportional to the effective length of tortuous path 43 disposed between openings 36 and 37.

The valve spool 39 is also provided with a generally V-shaped groove 46 in the top surface thereof and this groove 46 communicates with a smaller V-shaped groove 47 which extends along the side and throughout the length of the spool 39. When the spool 39 is positioned so as to bring groove 46 into communication with aperture 36, any air forced into aperture 36 is bled off through the grooves 46 and 47 and this prevents any unwanted buildup of pressure in the bellows 20 at a time when the valve spool 39 is in its closed position.

It is contemplated that numerous changes and modifications may be made in the present invention without departing from the spirit or the scope thereof.

What is claimed is:

In a slide projector, a gas flow responsive timing mechanism including the combination of means supplying a relatively constant gas flow, a valve comprising a housing and a variable positionable valve spool, said housing including an inlet operatively connected to said gas supplying means and disposed in the path of a flowing gas, an outlet for the gas and a shaped portion for receiving said valve spool, said valve spool including a cylindrical portion, a relatively flat portion and means defining a by-pass groove in said flat portion and being effective in one position in said valve spool for directly connecting said inlet and outlet whereby the time required for the gas pressure in said outlet to reach a predetermined value is a minimum, said valve spool including means defining a single elongate groove connected at one end to the by-pass groove and positionable in other positions of said valve spool so as to increasingly vary the effective length of flow path between said inlet and said outlet whereby the time required for the gas pressure in said outlet to reach the predetermined value is progressively greater as the effective length of the flow path between said inlet and said outlet increases, and said valve spool also including means defining a bleed-off groove on one side of said flat portion and extending along one side of said cylindrical portion and being effective in a different position of said flow control means for bleeding-off the gas from said inlet while said outlet is disconnected from said inlet, a bellows operatively connected to said outlet and a time control switch actuated by said bellows when the predetermined value is reached.

References Cited in the file of this patent

UNITED STATES PATENTS

| | | |
|---|---|---|
| 2,133,580 | Searle | Oct. 18, 1938 |
| 2,829,597 | Patterson | Apr. 8, 1958 |
| 2,968,474 | Eichelman et al. | Jan. 17, 1961 |
| 3,042,767 | Grostick | July 3, 1962 |
| 3,092,142 | Willson | June 4, 1963 |